United States Patent
Lee et al.

(10) Patent No.: US 12,533,986 B2
(45) Date of Patent: Jan. 27, 2026

(54) APPARATUS AND APPLICATION FOR PREDICTING DISCHARGE OF BATTERY

(71) Applicant: LG CHEM, LTD., Seoul (KR)

(72) Inventors: Hu Jun Lee, Daejeon (KR); Jae Dong Park, Daejeon (KR); Yean Sik Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 675 days.

(21) Appl. No.: 16/992,683

(22) Filed: Aug. 13, 2020

(65) Prior Publication Data

US 2021/0039519 A1   Feb. 11, 2021

(30) Foreign Application Priority Data

Aug. 5, 2019 (KR) .................. 10-2019-0095017

(51) Int. Cl.
  *B60L 58/12*   (2019.01)
  *G06Q 10/02*   (2012.01)
  *G06Q 50/40*   (2024.01)
  *H01M 10/42*   (2006.01)

(52) U.S. Cl.
  CPC ............. *B60L 58/12* (2019.02); *G06Q 10/02* (2013.01); *G06Q 50/40* (2024.01); *H01M 10/4257* (2013.01); *B60L 2240/70* (2013.01); *B60L 2250/16* (2013.01); *H01M 2010/4271* (2013.01)

(58) Field of Classification Search
  CPC .. B60L 58/12; B60L 2240/70; B60L 2250/16; G06Q 10/02; G06Q 50/30; H01M 10/4257; H01M 2010/4271
  See application file for complete search history.

(56) References Cited

U.S. PATENT DOCUMENTS

| 2007/0029974 | A1* | 2/2007 | Uchida | .............. G01R 31/3842 |
|---|---|---|---|---|
| | | | | 320/132 |
| 2015/0134186 | A1 | 5/2015 | Yuasa et al. | |
| 2015/0149221 | A1* | 5/2015 | Tremblay | ............... G06Q 50/12 |
| | | | | 320/109 |
| 2016/0036250 | A1 | 2/2016 | Cho et al. | |

(Continued)

FOREIGN PATENT DOCUMENTS

| JP | 2011-22988 A | 2/2011 |
|---|---|---|
| JP | 6397730 B2 | 9/2018 |

(Continued)

*Primary Examiner* — Abby J Flynn
*Assistant Examiner* — Paulo Roberto Gonzalez Leite
(74) *Attorney, Agent, or Firm* — Birch, Stewart, Kolasch & Birch, LLP

(57) ABSTRACT

Discussed is a battery discharge prediction apparatus and an application that perform receiving a setting for a parking period and a parking area of a pre-registered vehicle based on a user's input, receiving environment information of the parking area during the parking period from an external server, receiving state information of a battery of the pre-registered vehicle from the vehicle, and predicting a discharge timing of the battery based on the environment information of the parking area and the state information of the battery during the parking period, the predicting being performed by a device executing an application that predicts the discharge timing of the battery.

9 Claims, 6 Drawing Sheets

(56) References Cited

U.S. PATENT DOCUMENTS

| | | | |
|---|---|---|---|
| 2016/0084917 A1* | 3/2016 | Nam | G01R 31/392 |
| | | | 324/432 |
| 2019/0006724 A1 | 1/2019 | Cho et al. | |
| 2019/0039467 A1* | 2/2019 | Hortop | H02J 7/0071 |
| 2019/0139326 A1 | 5/2019 | Park et al. | |
| 2019/0232792 A1* | 8/2019 | Ahmed | B60L 53/66 |
| 2019/0252892 A1 | 8/2019 | Cho et al. | |
| 2020/0047745 A1 | 2/2020 | Suzuki et al. | |

FOREIGN PATENT DOCUMENTS

| | | |
|---|---|---|
| KR | 10-2004-0074783 A | 8/2004 |
| KR | 10-1502989 B1 | 3/2015 |
| KR | 10-2016-0014280 A | 2/2016 |
| KR | 10-1628911 B1 | 6/2016 |
| KR | 10-2017-0035229 A | 3/2017 |
| KR | 10-2018-0018040 A | 2/2018 |
| KR | 10-2019-0044115 A | 4/2019 |
| KR | 10-2019-0051160 A | 5/2019 |
| KR | 10-2019-0067304 A | 6/2019 |

\* cited by examiner

[FIG. 1]
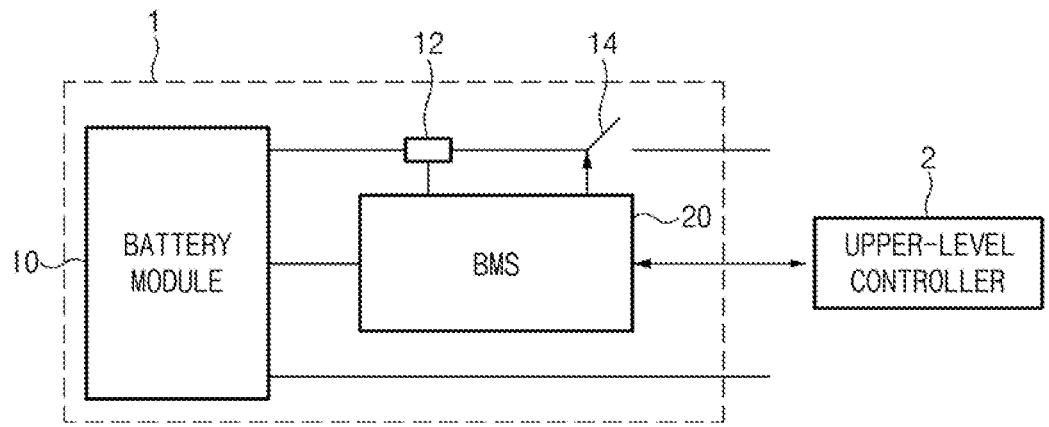
[FIG. 2]
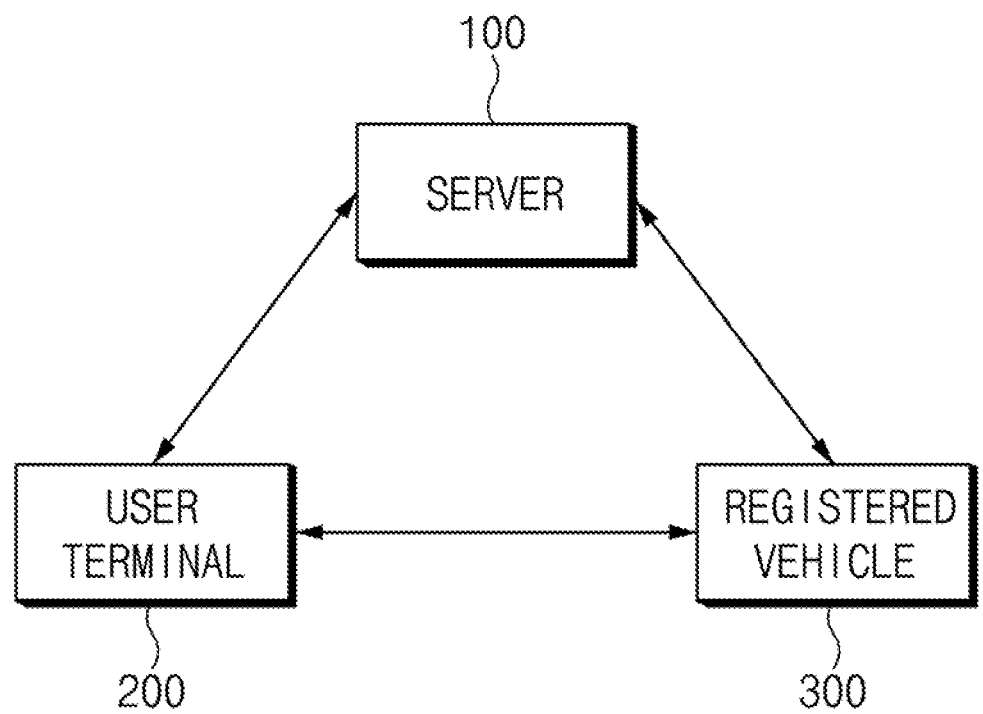

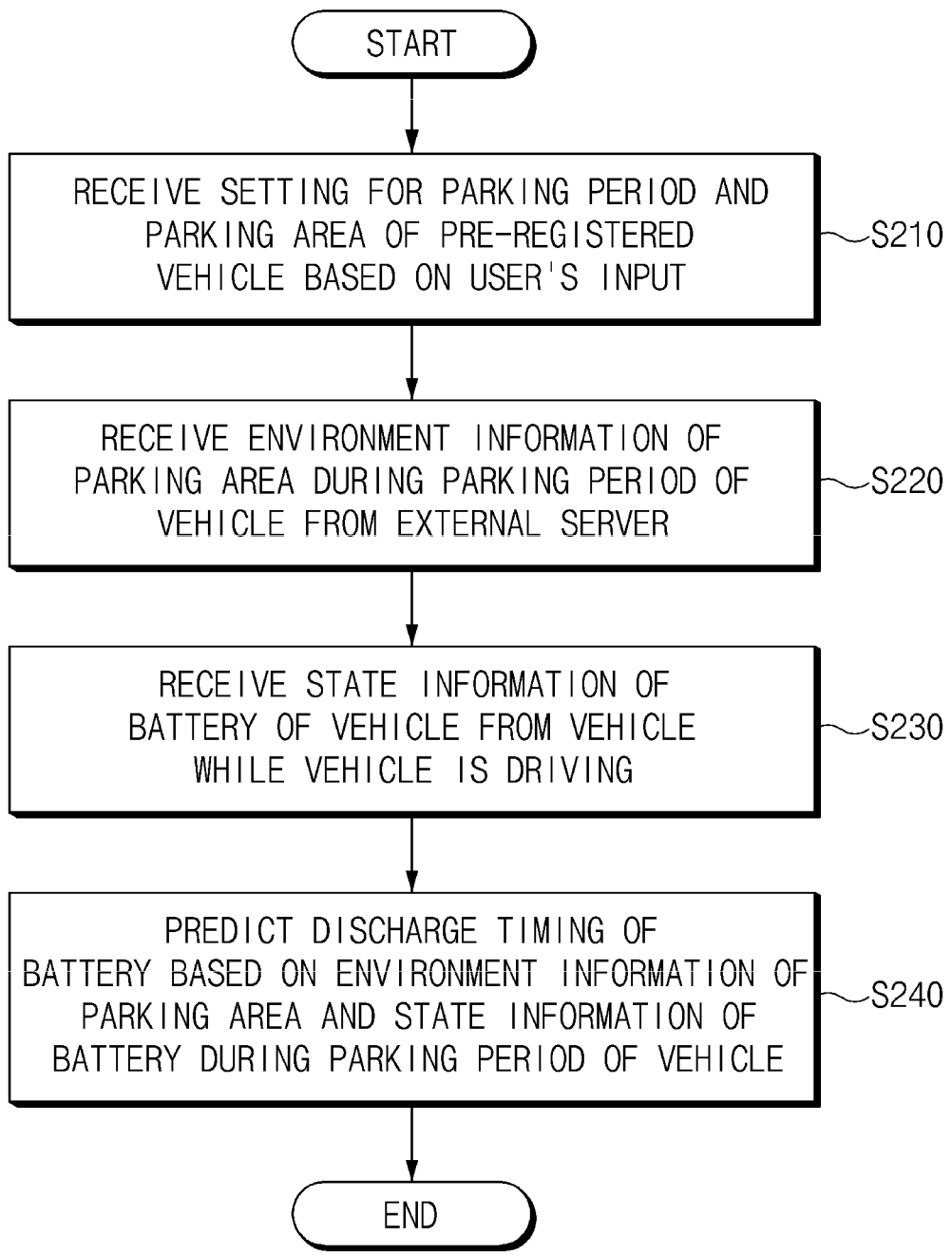

[FIG 4]
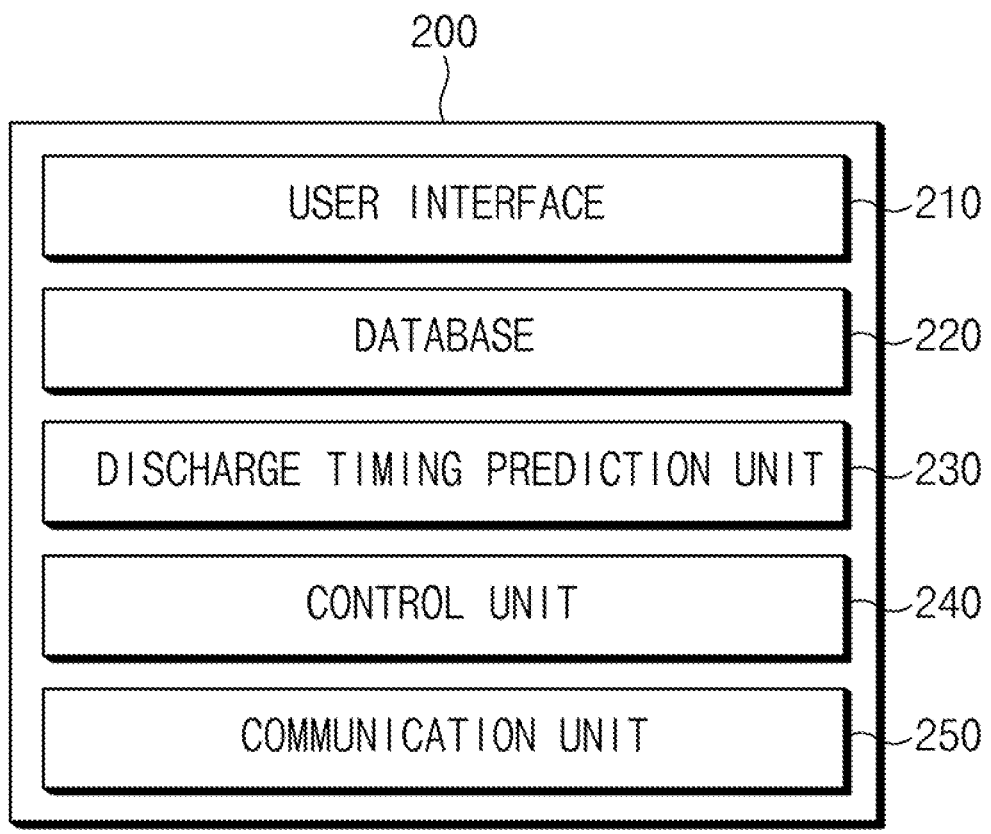

[FIG 5]
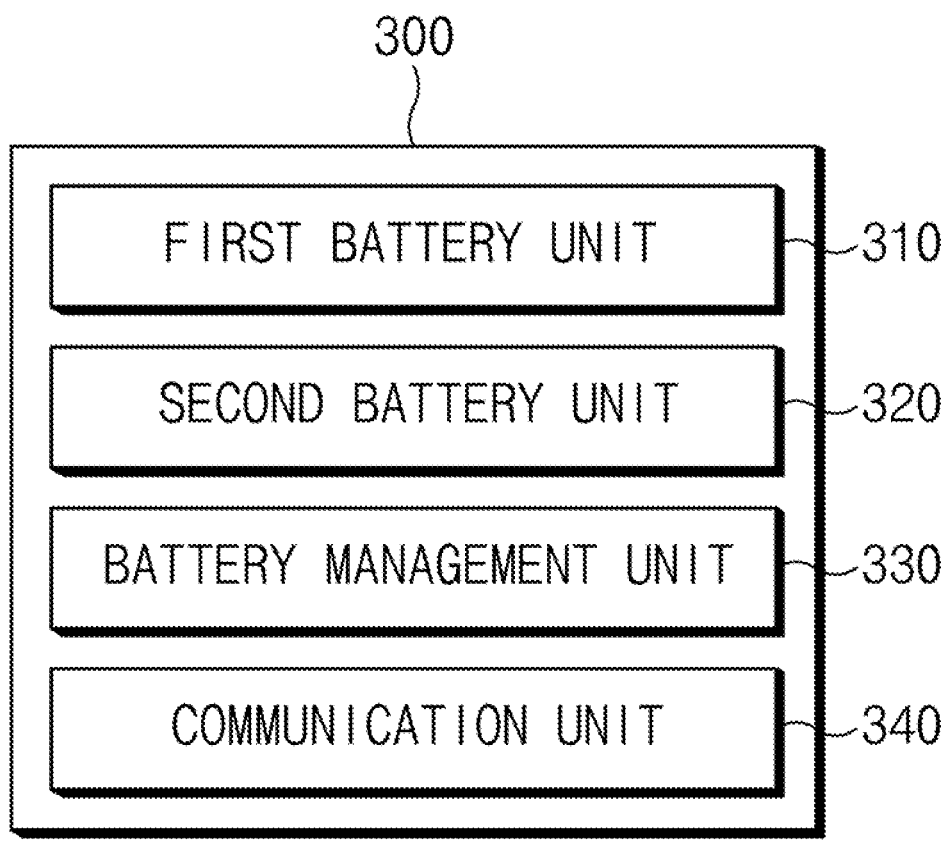

[FIG 6]
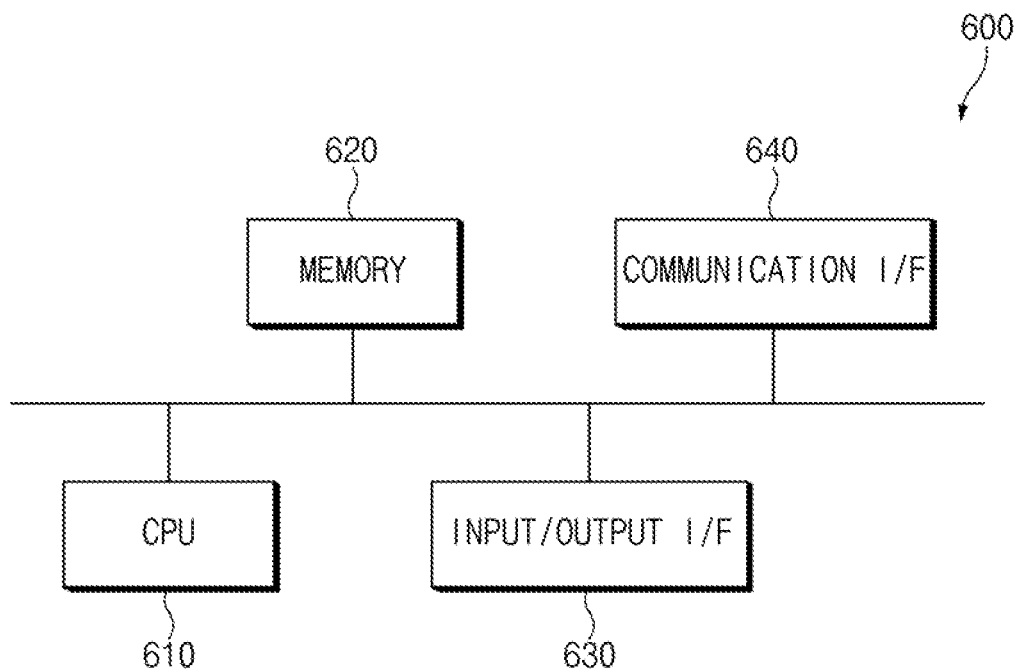

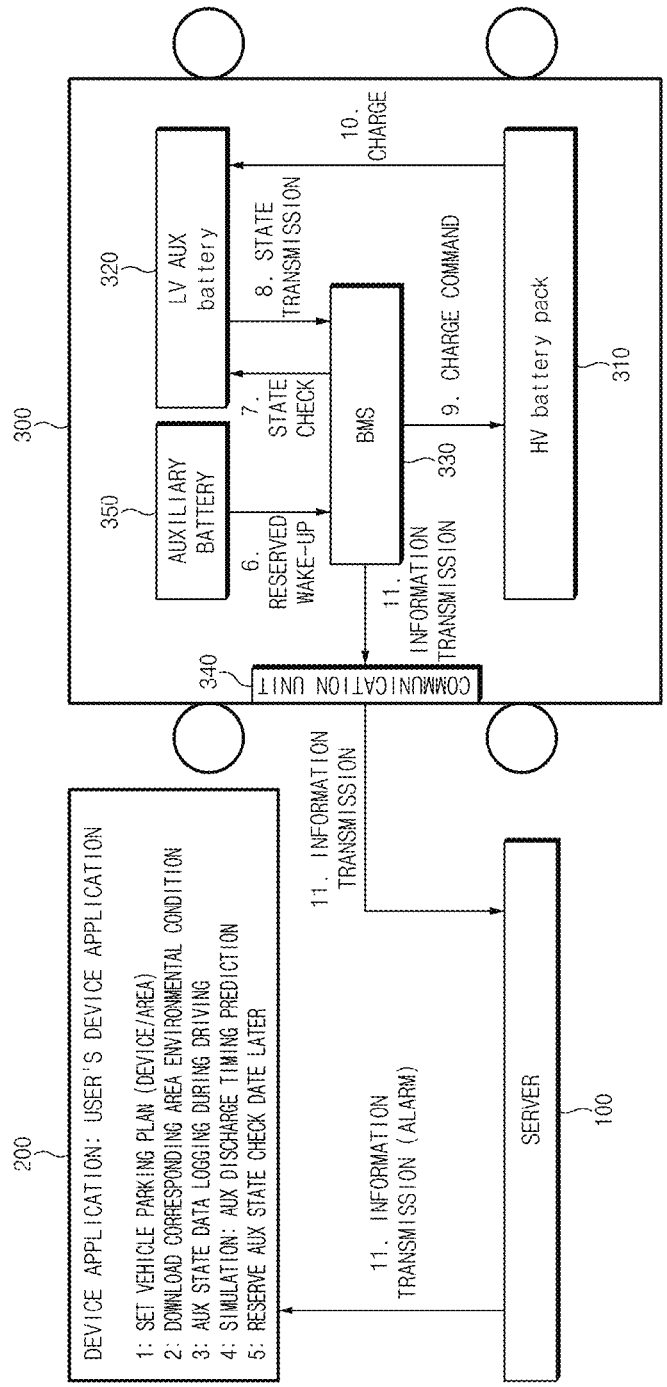

APPARATUS AND APPLICATION FOR PREDICTING DISCHARGE OF BATTERY

CROSS-REFERENCE TO RELATED APPLICATIONS

This application claims the benefit of Korean Patent Application No. 10-2019-0095017, filed on Aug. 5, 2019, in the Korean Intellectual Property Office, the disclosure of which is incorporated herein in its entirety by reference.

TECHNICAL FIELD

The present invention relates to a discharge prediction apparatus and application of a vehicle battery.

BACKGROUND ART

Recently, due to diversified functions of vehicles, carelessness of drivers, and influence of external environment, an AUX battery for vehicles is frequently discharged. Discharge of the vehicle AUX battery causes the battery to deteriorate and accelerates the reduction in life, so that continuous management is required.

In the conventional battery system, when the battery of the parked vehicle is discharged, management to prevent this in advance has not been performed. It is difficult to recognize a battery state and discharge of such a vehicle until the driver starts the engine.

Accordingly, conventionally, the state of the vehicle battery was identified by a black box, and the power was always cut off before being discharged but this only slightly delays the discharge of the AUX battery, and there is a problem in that the effect of preventing discharge is insufficient.

DISCLOSURE

Technical Problem

An object of the present invention is to provide a battery discharge prediction apparatus and an application for preventing discharge of a vehicle battery by predicting the discharge timing of the vehicle battery for a vehicle with a parking plan set for a predetermined period using the environmental conditions of the parking area and the state data of the battery.

Technical Solution

An application according to an embodiment of the present invention is an application stored in a computer-readable medium executed by a device executing an application that predicts discharge timing of a battery and includes a first battery configured to supply a high voltage to a vehicle, a second battery configured to supply a low voltage to the vehicle, a communication unit configured to receive a reservation request signal based on environment information of a parking area of the vehicle and state information of the battery from a user's device, and transmit a result of a state test of the second battery to the outside, and a battery management system configured to wake up based on the reservation request signal and checks a state of the second battery.

The application according to an embodiment of the present invention may include transmitting a reservation request for a state test of the battery to the vehicle based on the discharge timing.

The environment information of the parking area of the application according to an embodiment of the present invention may include temperature and humidity of the parking area.

The state information of the battery of the vehicle of the application according to an embodiment of the present invention may include state information of the battery until the vehicle is turned off after the vehicle is parked.

The application according to an embodiment of the present invention may include simulating a state change trend of the battery based on the environment information of the parking area and the battery state information.

The application according to an embodiment of the present invention may further include receiving state information of a battery of another pre-registered vehicle parked in the parking area during the parking period from an external server, wherein the predicting of the discharge timing of the battery may include predicting the discharge timing of the battery by further considering battery state information of the other pre-registered vehicle.

The application according to an embodiment of the present invention may include transmitting a request for generating a wake-up signal for operating the battery management system (BMS) of the vehicle at a reservation time of the state test.

A battery discharge prediction apparatus according to an embodiment of the present invention includes a first battery configured to supply a high voltage to a vehicle, a second battery configured to supply a low voltage to the vehicle, a communication unit configured to receive a reservation request signal based on environment information of a parking area of the vehicle and state information of the battery from a user's device, and transmit a result of a state test of the second battery to the outside, and a battery management system configured to wake up based on the reservation request signal and checks a state of the second battery, wherein the battery management system transmits a request signal to charge the second battery when the state of the second battery is less than a preset reference.

The battery management system of the battery discharge prediction apparatus according to an embodiment of the present invention may be operated by a wake-up signal generated according to the reservation request signal.

The wake-up signal of the battery discharge prediction apparatus according to an embodiment of the present invention may be received from an auxiliary battery of the vehicle.

The battery management system of the battery discharge prediction apparatus according to an embodiment of the present invention may charge the second battery with power supplied from the first battery by transmitting the request signal to the first battery.

The communication unit of the battery discharge prediction apparatus according to an embodiment of the present invention may transmit a result of a state test of the second battery to a user terminal or an external server.

A result of a state test of the second battery of the battery discharge prediction apparatus according to an embodiment of the present invention may include a charging state and a discharge prediction timing of the second battery.

The battery discharge prediction apparatus according to an embodiment of the present invention may predict the discharge timing of the second battery based on the result of the state test of the second battery.

The communication unit of the battery discharge prediction apparatus according to an embodiment of the present invention may receive state information of a battery of another pre-registered vehicle parked in a parking area of the vehicle, wherein the battery management system may predict the discharge timing of the second battery based on state information of the battery of the other pre-registered vehicle.

Advantageous Effects

According to the discharge prediction apparatus and application of the battery of the present invention, it is possible to prevent the discharge of the vehicle battery by predicting the discharge timing of the vehicle battery using the environmental conditions of the parking area and the state data of the battery for a vehicle with a parking plan set for a predetermined period.

DESCRIPTION OF DRAWINGS

FIG. 1 is a block diagram showing the configuration of a general battery management system.

FIG. 2 is a diagram illustrating communication between an application of a user terminal and a discharge prediction apparatus of a battery of a registered vehicle according to an embodiment of the present invention.

FIG. 3 is a flowchart illustrating an operation of an application according to an embodiment of the present invention.

FIG. 4 is a block diagram showing a function of an application according to an embodiment of the present invention.

FIG. 5 is a block diagram showing the configuration of a discharge prediction apparatus of a battery according to an embodiment of the present invention.

FIG. 6 is a diagram illustrating a hardware configuration of a discharge prediction apparatus of a battery according to an embodiment of the present invention.

FIG. 7 is a diagram illustrating an operation of a server, an application, and a discharge prediction apparatus of a battery of a vehicle according to an embodiment of the present invention.

BEST MODE

Hereinafter, various embodiments of the present invention will be described in detail with reference to the accompanying drawings. In this document, the same reference numerals are used for the same components in the drawings, and duplicate descriptions for the same components are omitted.

For various embodiments of the present invention disclosed in this document, specific structural or functional descriptions are exemplified only for the purpose of explaining an embodiment of the present invention, and various embodiments of the present invention may be implemented in various forms and should not be construed as being limited to the embodiments described in this document.

The terms such as "1st", "2nd", "first", "second", and the like used herein may refer to modifying various different elements of various embodiments of the present disclosure, but do not limit the elements. For example, a first component may be referred to as a second component and vice versa without departing from the technical scope of the present invention.

Terms used herein is for the purpose of describing particular example embodiments only and is not intended to be limiting of the scope of other embodiments. The terms of a singular form may include plural forms unless they have a clearly different meaning in the context.

Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood as having an ideal or excessively formal meaning. In any cases, even the terms defined in this specification cannot be interpreted as excluding embodiments of the present invention.

FIG. 1 is a block diagram showing the configuration of a general battery management system.

Referring to FIG. 1, a configuration diagram schematically showing a battery control system including a battery pack 1 and an upper-level controller 2 included in an upper-level system according to an embodiment of the present invention is shown.

As shown in FIG. 1, the battery pack 1 includes a battery module 10 composed of one or more battery cells and capable of being charged and discharged, a switching unit 14 connected in series to the + terminal side or the − terminal side of the battery module 10 to control the charge/discharge current flow of the battery module 10, and a battery management system 20 that monitors the voltage, current, temperature, and the like of the battery module 10 to control and manage it so as to prevent overcharge and overdischarge. Here, although the battery management system 20 is described as being connected to the battery module, it may be connected for each battery cell to monitor and measure the voltage and current temperature of the battery cells. A battery cell management system (not shown) is disposed for each battery cell, and each of the plurality of battery cell management systems may transmit and receive data to and from the battery management system 20 that monitors and controls the battery module. The battery cell management system is similar in operation and function to the battery management system 20.

Here, the switching unit 14 is a semiconductor switching element for controlling the current flow for the charge or discharge of the battery module 10, and for example, at least one MOSFET may be used.

In addition, in order to monitor the voltage, current, temperature, etc. of the battery pack module 10, the BMS 20 can measure or calculate voltages and currents of gates, sources, and drains of semiconductor switching elements, and in addition, can measure the current, voltage, temperature, etc. of the battery module using the sensor 12 provided adjacent to the semiconductor switching element 14. The BMS 20 is an interface for receiving the values obtained by measuring the above-described various parameters, and may include a plurality of terminals and a circuit that is connected to these terminals and processes the received values.

In addition, the BMS 20 may control ON/OFF of the switching element 14 such as the MOSFET and may be connected to the battery module 10 to monitor the state of the battery module 10.

The upper-level controller 2 may transmit a control signal for the battery module to the BMS 20. Accordingly, operations of the BMS 20 may be controlled based on a signal applied from an upper-level controller. The battery cell of the present invention may be a component included in a battery pack used for an ESS or a vehicle. However, it is not limited to this use.

Since the configuration of the battery rack 1 and the configuration of the BMS 20 are known configurations, more detailed description thereof will be omitted.

Meanwhile, the discharge prediction apparatus according to embodiments of the present invention may be connected to each of a plurality of battery cells connected in series in the battery module 10 to determine whether the battery cells are discharged. However, the present invention is not limited thereto, and the discharge prediction apparatus according to embodiments of the present invention may be connected to a battery module or a battery pack to determine whether it is discharged.

FIG. 2 is a diagram illustrating communication between an application of a user terminal and a discharge prediction apparatus of a battery of a registered vehicle according to an embodiment of the present invention.

Referring to FIG. 2, a server 100, a user terminal (application) 200, and a registered vehicle (vehicle, pre-registered vehicle, or discharge prediction apparatus) 300 may be connected through a network.

The server 100 may be an external server including a separate database and a communication module, and may transmit and receive various data to and from the user terminal 200 and the vehicle 300. For example, the server 100 may store information on environmental conditions (e.g., weather, temperature, humidity, etc.) of an area in which the registered vehicle 300 is parked. In addition, the server 100 may receive battery state information of the registered vehicle 300 and data related to battery discharge timing from the user terminal 200 and the registered vehicle 300. The received data may be stored in a database provided in the server.

As will be described later, the application stored in the user terminal 200 may download information on environmental conditions of a corresponding area from the server 100 when the user sets a parking plan for the vehicle. In addition, the application of the user terminal 200 may predict the discharge timing of the battery based on environmental information and battery state information, and transmit the result information to the server 100.

In addition, the user terminal 200 may transmit a reservation signal for waking up the battery management system to the registered vehicle 300, and receive data on the predicted discharge timing and charging state of the battery from the registered vehicle 300.

The registered vehicle 300 may be a vehicle previously registered by a user of the vehicle through an application or a web page according to an embodiment of the present invention. For example, when receiving a reservation signal from the user terminal 200, the vehicle 300 may predict the state and discharge timing of the internal battery using the battery management system, and transmit the result information to the server 100 or the user terminal 200.

Specific operations of the server 100, the user terminal 200, and the vehicle 300 of FIG. 2 will be described below.

FIG. 3 is a flowchart illustrating an operation of an application according to an embodiment of the present invention.

Referring to FIG. 3, an application according to an embodiment of the present invention may be executed by a device executing an application that predicts the discharge timing of a vehicle battery.

First, the application may receive a setting for a parking period and a parking area of a pre-registered vehicle based on a vehicle user's input (S210). In this case, the user can directly set the parking period and parking area to be parked through an interface provided on the device. In addition, the set parking period and parking area can be arbitrarily changed if the user desires.

In addition, the application may receive a reservation time setting for the state test of the battery by the user. Therefore, the user can perform the battery state test of the vehicle at a desired time through the application.

Then, the application may receive environmental information of the parking area during the set parking period from the external server (S220). For example, the environmental information of the parking area may include temperature and humidity of the parking area during the parking period. In general, since the battery of a vehicle is highly influenced by the surrounding environment, it is necessary to obtain environmental information of an area where the vehicle is parked in advance in order to predict the discharge timing of the battery.

Next, state information of the battery of the vehicle may be received from the vehicle (S230). As described above, the user's device may be wirelessly connected to the vehicle through a network, and the device may directly receive state information of the battery measured by the battery management system BMS inside the vehicle. For example, the battery of the vehicle may include an auxiliary battery, a low voltage (LV) battery, and a high voltage (HV) battery.

In this case, the state information of the vehicle may include state information of the battery until the vehicle is parked and the engine is turned off. That is, data on the voltage and the degree of deterioration of the battery during driving of the vehicle may be logged through the application.

Further, the discharge timing of the vehicle battery may be predicted based on the environment information of the parking area during the parking period received from the server and the state information of the battery received from the vehicle (S240). In this case, a state change trend of the battery may be simulated based on the environment information of the parking area and the battery state information. In particular, it is possible to improve the previously expected simulation more accurately by reflecting the degree of change in the state of the battery of other vehicles parked in the same area. For example, the state change trend of the battery can be visualized in the form of a graph on the application of the user device.

Meanwhile, although not shown in FIG. 3, the application may transmit a reservation request signal for a state test of the battery to the vehicle based on the predicted discharge timing. In this case, the reservation request signal may include a reservation time for the battery management system to perform a state test of the battery.

In addition, the application may transmit a request to generate a wake-up signal for operating the vehicle's battery management system BMS at the reserved time of the state test of the battery. In this case, a separate auxiliary battery may transmit a wake-up signal or provide power for the wake-up signal to the battery management system.

The application according to an embodiment of the present invention may further include receiving state information of a battery of another pre-registered vehicle in the parking area from the external server during the parking period. In this case, it is possible to predict the discharge timing of the battery by further considering the battery state information of another pre-registered vehicle received from the predicting of the discharge timing of the battery.

That is, as described above, in addition to the algorithm calculation in consideration of environmental factors that affect the state of the battery, by analyzing and reflecting the battery state change information collected in the server from other registered vehicles parked in the area during the parking period, the discharge timing can be predicted more precisely.

In such a way, according to the application according to an embodiment of the present invention, by predicting the discharge timing of the vehicle battery using the environmental conditions of the parking area and the state data of the battery for a vehicle with a parking plan set for a predetermined period, it is possible to prevent the discharge of the vehicle battery.

FIG. 4 is a block diagram showing a function of an application according to an embodiment of the present invention.

Referring to FIG. 4, the user terminal 200 may include an application according to an embodiment of the present invention, and may include a user interface 210, a database 220, a discharge timing prediction unit 230, a control unit 240, and a communication unit 250. The application may be embodied as the user terminal 200.

The user interface 210 allows a user (e.g., a vehicle driver) to set or select various functions of the application according to an embodiment of the present invention. For example, the user interface 210 may be provided as a separate menu on the application, and may be provided in the form of a keyboard or a touch pad so that the user can directly input it.

For example, the user can directly set the parking area and the parking period of the vehicle through the user interface 210, and can directly download environmental information of the parking area during the parking period from the server.

The database 220 may store data inputted through the user interface 210 or received from an external server or vehicle. For example, the database 220 may store information on the parking area and parking period inputted through the user interface 210, identification information of the registered vehicle, environmental information of the parking area during the parking period received from the server, state information of the battery received from the vehicle, information on predicted discharge timing, and the like.

The discharge timing prediction unit 230 may predict the discharge timing of the battery by analyzing the environment information of the parking area received from the server and the state information of the battery received from the registered vehicle. In addition, the discharge timing prediction unit 230 may predict the discharge timing of the battery by additionally analyzing the battery state information of another vehicle collected from the server.

The control unit 240 functions to control various components of the application according to an embodiment of the present invention.

The communication unit 250 may receive data (e.g., environmental information such as weather, temperature, humidity data, etc. of a parking area) from an external server, and receive state information of a battery from a registered vehicle. In addition, the communication unit 250 may transmit a discharge prediction timing calculated through the application to the server, and may transmit a reservation request signal to the vehicle to wake up the battery management system of the vehicle. The function of the communication unit 250 may be implemented by a communication module included in a user terminal executing an application.

FIG. 5 is a block diagram showing the configuration of a discharge prediction apparatus of a battery according to an embodiment of the present invention.

Referring to FIG. 5, a discharge prediction apparatus 300 of a battery according to an embodiment of the present invention may include a first battery unit 310, a second battery unit 320, a battery management unit (a battery management system) 330, and a communication unit 340.

The first battery unit 310 may supply a high voltage to a vehicle. For example, the first battery unit may be a high voltage (HV) battery pack or a high voltage battery.

The second battery unit 320 may supply a low voltage to the vehicle. For example, the second battery unit may be a low voltage (LV) battery pack or a low voltage battery. The high voltage may be greater than the low voltage.

The battery management unit 330 may wake up based on a reservation request signal received from an application executed by the user's device, and check the state of the second battery. For example, the battery management unit 330 may be operated by a wake-up signal generated according to a reservation request signal. In this case, the wake-up signal may be received from the auxiliary battery of the vehicle.

In addition, the battery management unit 330 may transmit a request signal to charge the second battery 320 when the state of the second battery 320 is less than a preset reference. In this case, the battery management unit 330 may transmit a separate request signal to the first battery 310 to charge the second battery 320 with power supplied from the first battery 310.

The result of the state test of the second battery 320 by the battery management unit 330 may include a charging state and a discharge prediction timing of the second battery 320. As such, the battery management unit 330 may predict the discharge timing of the second battery 320 based on the result of the state test of the second battery 320.

In addition, the battery management unit 330 may predict the discharge timing of the second battery 320 based on state information of a battery of another pre-registered vehicle received through the communication unit 340. That is, the battery management unit 330 may more accurately predict the discharge timing by reflecting the battery state information of another vehicle to the discharge timing previously predicted through the battery state test.

The communication unit 340 may receive a reservation request signal from an application executed by a user's device. In addition, the communication unit 340 may transmit a result of the state test of the second battery 320 by the battery management unit 330 to the outside. In this case, the communication unit 340 may transmit the result of the state test of the second battery 320 to the user terminal or an external server.

In addition, the communication unit 340 may receive state information of a battery for another pre-registered vehicle parked in a parking area of the vehicle. In this case, the communication unit 340 may receive state information of the battery from another pre-registered vehicle from the server.

On the other hand, although not shown in FIG. 5, the discharge prediction apparatus 300 according to an embodiment of the present invention may further include a timer (not shown), and may measure the reservation time indicated by the reservation request signal received from the application with a timer. Accordingly, the battery management unit 330 may determine the reservation time by the timer and transmit a wake-up signal transmission request to the auxiliary battery.

According to the discharge prediction apparatus 300 of the battery according to an embodiment of the present invention, it is possible to prevent the discharge of the vehicle battery by predicting the discharge timing of the vehicle battery using the environmental conditions of the parking area and the state data of the battery for a vehicle with a parking plan set for a predetermined period.

FIG. 6 is a diagram illustrating a hardware configuration of a discharge prediction apparatus of a battery according to an embodiment of the present invention.

As shown in FIG. 6, the discharge prediction apparatus 600 of the battery may include a microcontroller (MCU) 610 that controls various processes and configurations, a memory 620 in which an operating system program and various programs (e.g., a battery pack abnormality diagnosis program or battery pack temperature estimation program to check the state of the battery) are recorded, an input/output interface 630 that provides an input interface and an output interface between a battery cell module and/or a switching unit (e.g., a semiconductor switching element), and a communication interface 640 capable of communicating with an external (for example, upper-level controller) through a wired or wireless communication network. As described above, the computer program according to the present invention may be recorded in the memory 620 and processed by the microcontroller 610 to be implemented as a module for performing the respective functional blocks shown in FIG. 3.

FIG. 7 is a diagram illustrating an operation of a server, an application, and a discharge prediction apparatus of a battery of a vehicle according to an embodiment of the present invention.

Referring to FIG. 7, a server 100, a user terminal (application) 200, and a registered vehicle (discharge prediction apparatus) 300 are included. In addition, the vehicle 300 may include a high voltage (HV) battery 310, a low voltage (LV) battery 320, a battery management system (BMS) 330, a communication unit 340, and an auxiliary battery 350.

First, the application of the user terminal 200 receives a setting for the parking plan (i.e., parking area and parking period) of the vehicle from the user. In addition, environmental information (e.g., temperature, humidity, etc.) that may affect the state of the battery for the set parking area and period is received from the server 100 of FIG. 7 or a separate external server.

When a user carrying the user terminal 200 drives the vehicle 300, the user terminal 200 is wirelessly connected to the vehicle 300 to receive state information of the battery of the vehicle 300 (e.g., the low voltage battery 320). Accordingly, the user may log data on the voltage of the low voltage battery 320 and the degree of deterioration before the vehicle 300 is turned off.

When the user terminal 200 receives the state information of the low voltage battery 320 from the vehicle 300, the application analyzes the state change of the low voltage battery 320 in the corresponding condition based on the environmental information and the state information of the low voltage battery 320 to predict the discharge timing of the low voltage battery 320. In addition, the application can predict the discharge timing of the low voltage battery 320 by using the battery state change information collected from another registered vehicle stored in the server 100. At this time, the application can simulate the state change trend of the low voltage battery 320. In particular, it is possible to improve the previously expected simulation more accurately by reflecting the degree of change in the state of the battery of other vehicles parked in the same area.

Through the application of the user terminal 200, the user can check the prediction result of the discharge timing of the low voltage battery 320 and reserve the state test of the low voltage battery 320 later. In this case, the user terminal 200 may transmit a reservation request signal for a state test of the battery to the communication unit 340 of the vehicle 300.

When the reservation time comes, the battery management system 330 may wake up with the power of the auxiliary battery 350. Further, the battery management system 330 performs a state test of the low voltage battery 320 at a reserved time. As a result, when there is an abnormality in the state of the low voltage battery 320 or is in a discharged state, the battery management system may charge the low voltage battery 320 by transmitting a charging command to the high voltage battery pack 310.

In addition, the communication unit 340 may transmit information on the state and discharge prediction timing of the low voltage battery 320 to the server 100. In this case, the data on the state information of the battery 320 of the vehicle collected by the server 100 may be used to predict the discharge timing of another vehicle. The server 100 may provide an alarm by transmitting state information on the low voltage battery 320 received from the vehicle 300 and information on the discharge prediction timing back to the user terminal 200.

Meanwhile, in FIG. 7, it has been described that state information and discharge timing of the low voltage battery 320 are predicted, but the present invention is not limited thereto, and for other types of batteries, the discharge timing can be predicted by performing a state test.

In such a way, according to the discharge prediction apparatus and application of the battery according to an embodiment of the present invention, it is possible to prevent the discharge of the vehicle battery by predicting the discharge timing of the vehicle battery using the environmental conditions of the parking area and the state data of the battery for a vehicle with a parking plan set for a predetermined period.

In the above, even though all the components constituting the embodiments of the present invention are described as being combined into one or operating in combination, the present invention is not necessarily limited to these embodiments. That is, within the scope of the object of the present invention, all of the constituent elements may be selectively combined and operated in one or more.

In addition, the terms "include", "compose", or "have" as described above means that the corresponding component can be intrinsic, unless otherwise stated, so that it should be interpreted that other components may be further included, not excluded. All terms, including technical or scientific terms, can be interpreted as having the same meaning as generally understood by a person skilled in the art to which the present invention belongs, unless otherwise defined. Generally used terms, such as predefined terms, should be interpreted as being consistent with the contextual meaning of the related art, and are not to be interpreted in an ideal or excessively formal sense, unless explicitly defined in the present invention.

The above description is merely illustrative of the technical idea of the present invention, and those skilled in the art to which the present invention pertains will be able to make various modifications and variations without departing from the essential characteristics of the present invention. Therefore, the embodiments disclosed in the present invention are not intended to limit the technical spirit of the present invention, but to explain, and the scope of the technical spirit of the present invention is not limited by these embodiments. The scope of protection of the present invention should be construed according to the following claims, and all technical ideas falling within the scope of the same shall be construed as falling within the scope of the present invention.

The invention claimed is:

1. A battery discharge prediction apparatus comprising:
a first battery configured to supply a first voltage to a vehicle;
a second battery configured to supply a second voltage to the vehicle;
a communication unit configured to receive a reservation request signal for inspecting a state of the second battery at a reservation time based on environment information of a parking area of the vehicle and state information of the second battery from a user terminal, and transmit a result of a state test of the second battery to the user terminal or an external server; and
a battery management system configured to wake up based on the reservation request signal and check the state of the second battery using the state test of the second battery,
wherein the battery management system transmits a request signal to charge the second battery when the state of the second battery is less than a preset reference,
wherein the reservation request signal is transmitted based on a predicted discharge timing, and the reservation request signal includes the reservation time for the battery management system to perform the state test of the second battery,
wherein the communication unit receives state information of a battery of another pre-registered vehicle parked in the parking area of the vehicle,
wherein the battery management system predicts the predicted discharge timing of the second battery based on the state information of the battery of the another pre-registered vehicle,
wherein the battery management system further adjusts the predicted discharge timing by reflecting at least one of a battery state change information of the another pre-registered vehicle and a battery state change information of the second battery based on the environment information of the parking area of the vehicle and the state information of the second battery,
wherein the battery management system reflects the battery state change information of the another pre-registered vehicle by reflecting a degree change in the state information of the battery of the another pre-registered vehicle, and
wherein the degree change in the state information of the battery of the another pre-registered vehicle includes a simulated trend of the degree change of the state information that is visualized in a form of a graph for the user terminal.

2. The battery discharge prediction apparatus of claim 1, wherein the battery management system is operated by a wake-up signal generated according to the reservation request signal.

3. The battery discharge prediction apparatus of claim 2, wherein the wake-up signal is received from an auxiliary battery of the vehicle.

4. The battery discharge prediction apparatus of claim 1, wherein the battery management system charges the second battery with power supplied from the first battery by transmitting the request signal to the first battery.

5. The battery discharge prediction apparatus of claim 1, wherein the result of the state test of the second battery comprises a charging state and a discharge prediction timing of the second battery.

6. The battery discharge prediction apparatus of claim 1, wherein the battery discharge prediction apparatus predicts the discharge prediction timing of the second battery based on the result of the state test of the second battery.

7. The battery discharge prediction apparatus of claim 1, wherein the first voltage is greater than the second voltage.

8. The battery discharge prediction apparatus of claim 1, wherein the state information of the second battery includes information on a voltage and a degree of deterioration of the second battery that is logged during driving of the vehicle until the vehicle is parked and an engine of the vehicle is turned off.

9. The battery discharge prediction apparatus of claim 1, wherein the reservation time is time kept by a timer or is a calendar time.

* * * * *